J. N. JOHNSON.
TRACK INSTRUMENT.
APPLICATION FILED MAY 20, 1914.
1,199,990.
Patented Oct. 3, 1916.
2 SHEETS—SHEET 1.
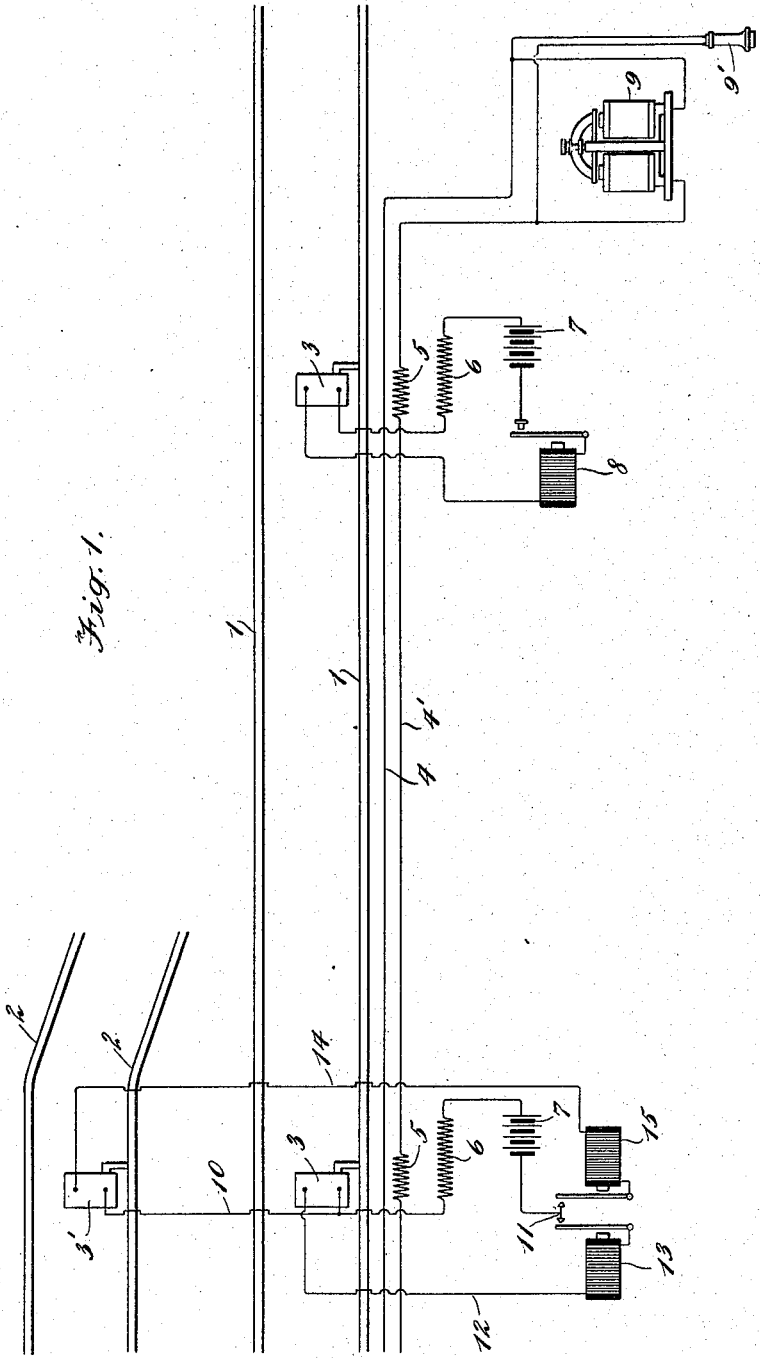

J. N. JOHNSON.
TRACK- INSTRUMENT.
APPLICATION FILED MAY 20, 1914.
1,199,990.
Patented Oct. 3, 1916.
2 SHEETS—SHEET 2.
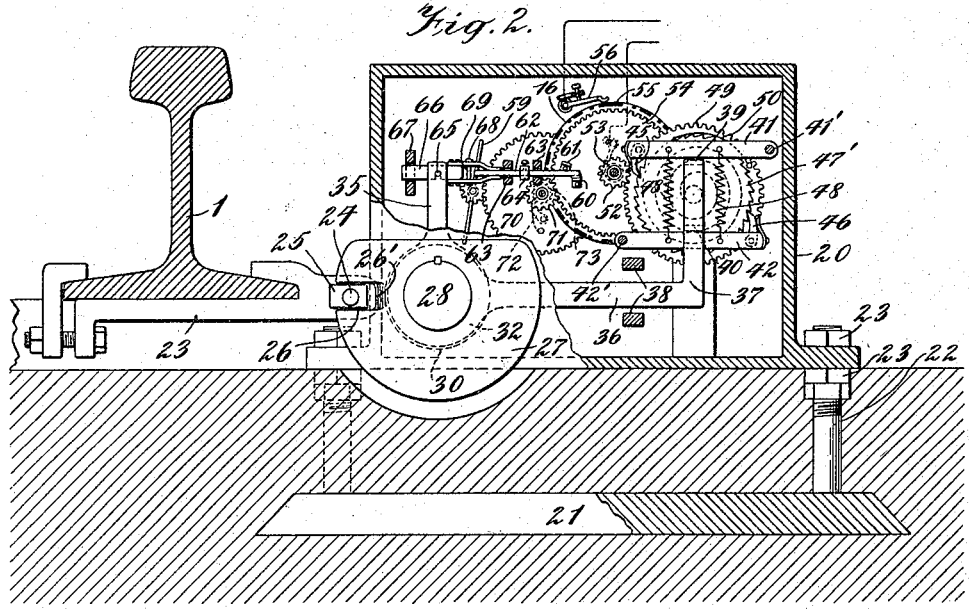
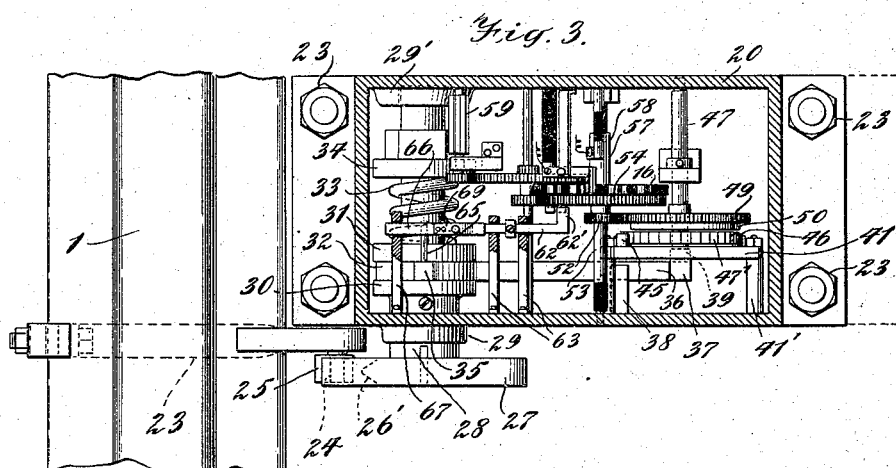
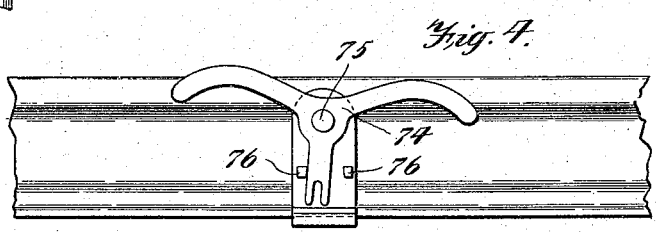
Witnesses:
Inventor
John N. Johnson
By his Attorneys

UNITED STATES PATENT OFFICE.

JOHN N. JOHNSON, OF ALBUQUERQUE, NEW MEXICO.

TRACK INSTRUMENT.

1,199,990.  Specification of Letters Patent.  Patented Oct. 3, 1916.

Application filed May 20, 1914. Serial No. 839,697.

*To all whom it may concern:*

Be it known that I, JOHN N. JOHNSON, a citizen of the United States, residing at Albuquerque, in the county of Bernalillo and State of New Mexico, have invented certain new and useful Improvements in Track Instruments, of which the following is a full, clear, and exact description.

This invention relates to track instruments and more particularly to instruments which are adapted for use with signal systems for automatically indicating at the train despatcher's office the respective positions of a number of trains along the trackway. Systems of this character generally comprise a signaling instrument at the train despatcher's office which is connected to a signal circuit over which electric impulses are transmitted by a number of track instruments located along the trackway at points where an operator is not on continuous duty or at sidings or spur tracks where there is no operator, which impulses are translated by the instrument in the train despatcher's office into distinctive intelligible code signals indicating the exact position of the car or train along the trackway. The track instruments are usually either electrically or mechanically actuated by the passing of a car over the trackway at the point opposite a track instrument.

The objects of this invention are to provide a mechanically-actuated track instrument which is reliable in operation and of compact construction and which is not liable to get out of order when subjected to varying climatic conditions; to provide an instrument in which the energy is stored for transmitting the electric impulses by the movement produced by a car or train in passing over the track rails and in which the transmission of electric impulses is controlled in the same manner and simultaneously with the storing of the energy; to provide an instrument in which a sequence of electric impulses are transmitted by a track instrument and are repeated a plurality of times for one actuation of the track instrument, irrespective of whether the car or train stops and remains standing on the track rails opposite the instrument; and to provide an instrument which will operate uniformly notwithstanding variations in the forces which actuate the same.

With these and other objects in view, my invention consists of the constructions and combinations which will be hereinafter set forth in detail in the specification and particularly pointed out in the appended claims.

In the accompanying drawings, Figure 1 is a diagrammatic view showing the manner in which the track instruments are connected to a system; Fig. 2 is a side elevation of a track instrument embodying the features of my invention with the side face of the casing removed to more clearly show the parts; Fig. 3 is a plan of Fig. 2, the top of the casing being removed; and Fig. 4 is a detail of a modified construction for actuating the track instrument.

Fig. 1 shows a novel form of an electric signaling system with which the track instrument is preferably adapted to be used, 1 designating the track rails of a main line, and 2 the track rails of a siding or spur track. Located adjacent one of the track rails 1 at desired points along the trackway, as, for example, at the stations at which the station agent or telegraph operator is not on continuous duty, are track instruments which are broadly designated 3. A similar track instrument 3′ is also located adjacent one of the track rails of the siding track 2. The electric impulses which are transmitted by the track instruments 3 and 3′, respectively, as will be hereinafter described in detail, are impressed upon the ordinary telephone circuit which is used to connect the various stations along a railway line and over which the train despatcher is ordinarily informed by telephonic communications from the various stations of the passing of a train by a station. The impressing of the signaling impulses upon the regular telephone circuit without interfering with the ordinary telephonic communication between the stations is accomplished by inserting in series with one of the line wires 4, 4′ of the telephone circuit a plurality of secondary transformer coils 5 which are positioned adjacent the track instrument and consist of a few turns of large gage wire so as not to interpose an objectionable amount of resistance in the telephone circuit which might choke or otherwise affect the transmission of the high frequency talking current. Each of the track instruments is provided with a rotary contact wheel, as will be later described, for controlling the making and breaking of a local circuit which in the single instrument along the main track, consists of a primary coil 6 arranged in series with a battery 7 and an interrupter 8, whereby a series of electric impulses may be transmitted by induction through the coil 5 to the telephone circuit and over the telephone lines to an instrument 9 located in the office of the train despatcher. The instrument 9 may comprise any form of device for translating electric impulses into either visual or audible signals, such as are now commonly used for this purpose. Instead of using an additional instrument as 9, the train despatcher may utilize telephone receiver 9′, as the impulses transmitted over the telephone line by the track instrument will actuate the receiver to cause audible sounds to be produced which are intelligible to the train despatcher and which will be heard by him even simultaneously with the transmission of the talking current. Where two track instruments are adjacent each other but on a main and spur track, respectively, the instruments may be connected up as shown on the left hand portion of Fig. 1 so that the electric impulses transmitted by each track instrument will be sent over the telephone circuit by induction through a single transformer. Here one branch of the circuit which is opened and closed at the track instruments 3 and 3′ is connected to a common wire 10 which passes through the transformer coil 6 and the battery 7 in series to a double contact 11. The other branch 12 leading from the track instrument 3 is connected in circuit through an interrupter 13 to the contact 11, while the other branch 14 of the track instrument 3′ is connected to the same contact through an interrupter 15. The track instruments are therefore connected in parallel through separate interrupters 13 and 15, respectively, so that the electric impulses transmitted by each track instrument will pass through its corresponding interrupter and not through the interrupter of the other track instrument. These interrupters or vibrators are of the usual construction such as are used in electric bells but their armatures have different periods of vibration which may be accomplished in any of the usual ways, so that the frequency of the pulsating current which passes over the telephone circuit will be different for each track instrument. The instrument 9 at the train despatcher's office is so designed that the signal given by it will vary for the different frequencies of pulsating current transmitted to it, whereby the train despatcher may easily distinguish between the signals transmitted by different track instruments, even though two of such signals should be simultaneously transmitted over the line. Where the telephone receiver is used instead of instrument 9, the train dspatcher also can readily discriminate between the impulses of different frequencies as they will be translated by the receiver into sounds of different tones.

The sequence and duration of electric impulses which are transmitted by each track instrument are different, as, for example, as is shown in Fig. 2 of the drawing, a rotary contact-wheel 16 is disclosed which is adapted to transmit a plurality of impulses of length and duration which correspond to the code signal used to designate the letter A in the Morse telegraphy code and the instrument at another station would be designed to transmit a code signal corresponding to the letter B of the Morse code. At a station where there is a second track instrument such as 3′ which is located on a spur track, its rotary contact wheel, will, in addition to sending the electric impulses corresponding to the letter of the Morse code which designates the opposite station on the main track, send other impulses which may, for example, consist of two short electric impulses, which, when transmitted, will be understood by the train despatcher as indicating that a train is on the spur track opposite a particular station. It will therefore be seen that by a system such as disclosed, the position of a train or car at any determined point along the trackway at which a station agent or telegraph operator is not positioned, will be automatically transmitted to the train despatcher's office by a series of different signals which may be readily interpreted by him, and since the vibrators or interrupters operated in connection with each track instrument impress upon the telephone line pulsating current of varying frequency, the distinctive intelligible signals which correspond to each track instrument may be readily distinguished by the train despatcher, even though two or more of such signals be impressed simultaneously upon the telephone line. By connecting the circuits of the track instruments to the regular telephone circuit by means of the transformers which are so designed as not to interfere with the usual talking current which is transmitted over the same, it is evident that the system may be installed without the necessity for any line wires extending the entire system, which reduces the expense of installations and maintenance to a material degree.

Referring now to the details of construction of the track instrument which is disclosed in Figs. 2 and 3 of the drawing, 20 designates a weather and water-proof metal casing which is adapted to inclose the transmitting mechanism and which is mounted on a base-plate 21 set solidly in the ground by means of threaded bolts 22, the upper ends of which pass through flanges projecting from the bottom of the casing 20, and to which the casing is rigidly secured by the nuts 23 which permits the casing and hence the transmitting mechanism to be moved relatively to the base of one of the track rails 1 adjacent to which the casing is located. In the preferred embodiment of my invention, the track instrument is actuated by the depression of the rail caused by a car in passing over the same, which depressions have been found in actual practice to cause the rail to move up and down through a distance of about a quarter of an inch. The mounting of the casing 20 in the manner described insures that this casing will be immovable with respect to the base of the rail, so that the movement of the rail can be imparted to the transmitting mechanism to actuate the same as will now be described.

Rigidly secured to the base of the rail is a clamp 23, which carries a lug extending in the direction of the track instrument upon which lug is pivotally mounted, as at 24, a substantially rectangular member 25, which fits into a slot 26 cut in a disk 27, whereby the up and down movements of the rail will be translated into oscillatory movements of this disk. The disk 27 is rigidly secured to one end of a shaft 28 which passes through a close fitting bearing 29 in the casing, the other end of the shaft being supported in a suitable bearing 29' formed on the inner face of the opposite side wall of the casing. It will therefore be seen that the disk 27 performs the function of rocking the shaft 28, for which reason it is preferably made in the circular form shown so that no foreign matter such as dirt, sand, snow, etc., which may accumulate under it, can interfere with the rocking motion caused by the up and down movements of the rail. The inner wall of the slot 26 is preferably provided with a knife edge 26' so as to cut any obstructing material such as ice which might form in the opening between the member 25 and the end of the slot.

Keyed to the shaft 28 to rotate therewith, are two friction disks 30 and 31, the disk 30 being rigidly secured thereto while the disk 31 is permitted a sliding longitudinal movement along the shaft. A lever having a hub portion 32 is revolubly mounted on the shaft 28 between these disks and the disk 31 is pressed thereagainst by means of a stiff coiled spring 33 whose tension may be varied by means of a nut 34 threaded on the shaft 28. Projecting from the hub 32 are two lever arms 35 and 36, the arm 35 extending upwardly while the arm 36 extends laterally and at right angles to the arm 35, and has at its free end an up-standing portion 37. When a rocking movement is imparted to the shaft 28 by means of the disk 27, which is oscillated upon the up and down movement of the rail, this rocking movement is transmitted to the lever arms 35 and 36, through the friction disks 30 and 31 described, and under normal conditions, since the depression of the rail is substantially uniform, the lever arms will move through uniform paths. It has been found, however, that the rail depression varies to a considerable extent with the weight of the car passing over a rail at a given point, as, for example, the depression of a rail due to the passing of a heavy engine will sometimes be almost as much as three-eighths of an inch. In order to insure that the movement of the lever will be uniform irrespective of variations in the rail depression, stops 38 are provided which are adapted to engage with the lever arm 36 and thus prevent undue rocking movement of the same, the friction clutch connection between this lever arm and the shaft 28 permitting the lever arm to yield without any danger of the breakage of the parts which would otherwise occur. It is to be understood that these stops are so positioned as to allow free movement of the lever under ordinary rail depression conditions so that the friction clutch disks 30 and 31 are used only to take care of abnormal depressions of the rail due to the passing of an extra heavy car or engine over a track rail.

The up-standing portion 37 has two laterally-projecting lugs 39 and 40 which are adapted to engage, respectively, with levers 41 and 42 pivoted at opposite ends to the casing 20, as at 41' and 42', the projection 39 engaging with lever 41 to lift the same and the projection 40 with the lever 42 to lower the same upon rocking movement of the main lever arm 36. Mounted at the free ends of the lever arms 41 and 42, respectively, are pawls 45 and 46, which are spring pressed against a ratchet wheel 47' loosely mounted on a shaft 47 mounted in suitable bearings in the casing 20. The levers 41 and 42 are maintained with their pawls in engagement with the teeth of this ratchet wheel preferably by two tension springs 48 which are fastened at their ends to the lever arms 41 and 42 and pull these arms against the projections 39 and 40 which prevent further movement of the arms toward each other. Keyed to the shaft 47 and spaced from the ratchet wheel, is a gear wheel 49, and interposed between the two is a flat coiled spring 50 having its outer end anchored to the gear wheel, while its inner end is secured to the hub of the ratchet wheel. Upon upward movement of the lever arm 36 the projection 39 carried thereby will force the upper lever arm 41 upwardly and through the tension springs 48 lift the lower lever arm 42 and its pawl 46 which is in engagement with the ratchet wheel 47' to rotate the same in a counterclockwise direction, as viewed in Fig. 2. Upon downward movement of the lever arm, the lower projection 40 will engage the lower lever arm 42 and through the tension springs lower the upper lever arm 41, whereby its pawl 45 will engage the ratchet wheel and also rotate it in a counterclockwise direction, the ratchet wheel therefore being rotated in the same direction upon the rocking of the lever arm which rotation will tend to wind up the flat coiled spring 50 as the gear wheel 49 is held against rotation as will be later described. When the device is at rest, the pawls 45 and 46 will prevent backward movement of the ratchet wheel. By constructing the winding mechanism for the gear wheel 49 in this manner, over-winding and danger of breakage of the coiled spring 50 is prevented, for since the lever arms 41 and 42 upon which the pawls are mounted are actuated through tension springs 48 which are made of greater resiliency than the coiled spring 50, when the latter is wound to the desired degree, upon the upward and downward movements of the lever-arms 41 and 42 after the coil spring is fully wound, the tension springs will yield, which will prevent any further actuation of the ratchet wheel 47', but the pawls 45 and 46 will retain their engagement with the ratchet teeth. After the gear wheel has been rotated as will be later described, and the coiled spring 50 partially unwound, the resiliency of the tension springs 48 is then less than the coiled spring 50 and further upward and downward movement of the lever arm will actuate the ratchet wheel in the manner described.

The gear wheel 49 meshes with a pinion 52 keyed to a shaft 53 to which is secured a gear wheel 54 and the rotary contact disk 16. The contact disk which is of conductive material, has inserted in the peripheral face a plurality of insulated parts which are arranged so that the circuit which is closed therethrough will be made and broken for periods corresponding to the letter A of the Morse code, that is, . —, the inserted portions being so arranged that the impulses will be transmitted a plurality of times for a single revolution of the disk, as will be clear from the drawing. Preferably a strip of insulating material 55 is provided upon which a contact arm 56 rests when the wheel is in its normal position. The contact arm 56 is of any well known construction, the pressure of which upon the wheel may be controlled by an adjusting screw. Connected to the contact arm 56 is one of the wires which leads from the track instrument to the battery and interrupter. The contact disk 16 is insulated from the shaft 53 by a sleeve of insulating material, the disk being provided with a sleeve 57 of conducting material upon which a second spring contact arm 58 continually rests, which contact arm is connected to the other wire leading from the track instrument. The spring contact arms 56 and 58 are suitably mounted on and insulated from the walls of the casing 20. It is to be understood that the pieces of insulating material inserted in the peripheral surface of the contact wheel are different for each track instrument so that the electric impulses which are transmitted, by the same will vary to transmit distinctive intelligible signals to the train despatcher's office in the manner which has been described. The rotation of the rotary contact wheel 16 is retarded by means of a fan 59 which through a system of pinions and gears is rotated by the gear wheel 54.

Referring now to the mechanism for controlling the rotation of the contact wheel 16, 60 and 61 designate stops which are mounted on the gear wheel 54 out of radial and circumferential alinement with each other, which stops are adapted to be engaged by lug 62' carried by a laterally sliding rod 62 mounted in spaced bearings 63 projecting from the side wall of the casing. The stroke of this rod is limited by an adjustable collar 64 mounted on the rod between the bearings, so that when the rod is in its extreme position toward the right, the lug 62' is in engagement with the stop 60 and when the rod has been moved to its extreme position to the left, the lug 62' has been moved out of engagement with stop 60, and into the path of the stop 61. Sliding motion is imparted to this rod through the lever arm 35 by means of a pin 65 projecting laterally from the upper end of this lever arm, which pin engages in a slot in a slidable member 66, one end of which rides in a guide 67 projecting from the side wall of the casing, while the other end is slidably connected to the rod 62 by means of the spring clutch members 68 which are secured to the other end of the sliding member 66 and have their free ends pressed against the end of the sliding rod 62, and serve to transmit the reciprocating movement which the sliding member 66 receives from the lever arm, to the sliding rod. An adjusting screw 69 passing through the spring clutch members regulates the friction with which these members engage the rod. By the construction described, the variations in rail depression is compensated for by providing a sliding connection between the parts and regulating the throw of the sliding rod 62 by means of the spaced bearings and collar, any variation in the rail depression will be taken up by the spring fingers 68 sliding on the rod and will not affect the length of the stroke of the sliding rod 62 which directly controls the rotation of the contact wheel. In order to decrease the force with which the stops 60 and 61 strike the sliding rod 62 one of the gear wheels 70 in the power transmission to the fan 59 is loosely mounted on its shaft and is rotated by a pinion 71 through a pawl 72 mounted on the gear wheel and a ratchet wheel 73 which is secured to pinion 71. When one of the stops 60 or 61 strikes the lug on the end of the sliding rod 62, any momentum which the fan 59 may have acquired will not aid in forcing the stop against the sliding rod, since the pawl and ratchet connection will permit the gear wheel 70 to rotate independently of the pinion 71.

While it is preferable to operate the track instrument through the rail depression, yet it is apparent that the same may be accomplished by means of the rocking levers shown in Fig. 4, but the position of the track instrument would necessarily be changed to accommodate the use of such levers which may be readily accomplished where conditions demand. In Fig. 4, the rocking arm 74 which consists of a T-shaped lever which is mounted on a horizontal pivot 75 adjacent the ball of the rail, has laterally-extending arms curved so that one of the arms is always above the level of the rail and the passing of a car wheel over the same will alternately move the lever to and fro, giving it a rocking motion, that is, when one arm of the lever is forced down by the car wheel the other arm rises to a position to be afterward forced down by the next car wheel, whereby a positively actuated lever is produced which requires no springs to return it to its normal position. Stop lugs 76 may be provided if desired to limit the throw of the arm in either direction. It is evident that should an actuating member of this character be used, the sliding connections between the various parts of the transmitting mechanism are still advantageous since variations might readily occur in the throw of the arm 74 depending upon the speed at which the train is traveling which would be more apt to happen should the stop lug which limits the throw of the arm become broken or spaced a distance apart greater than the predetermined throw which is to be imparted to the lever arms 35 and 36.

From the description of the track instrument hereinbefore set forth, it is evident that as the track rail 1 is depressed by a car passing thereover, the lever arm 35 will be drawn toward the left and the end of the sliding rod 62 drawn out of engagement with the stop 60 which will permit the contact wheel 16 to rotate in a clockwise direction until the same has completed a single revolution when the stop 61 will then engage the end of the sliding rod 62 and prevent further rotation of the same. As the car leaves the portion of the rail opposite the track instrument, the rail will assume its normal position or will move upwardly, which will throw the end of the sliding rod out of engagement with the stop 61 back into the path of the stop 60 which will prevent a second rotation of the contact disk. Should a train stop on the rail opposite the track instrument, the rotary contact disk will at least make one revolution and therefore transmit a plurality of electric impulses to the system which will automatically indicate in the train despatcher's office that a train has arrived at that point, and as the train again moves on, the rotary contact wheel will again be rotated as the rod 62 will again be moved out of the path of stop 60 on the next depression as the next car passes over the same, which will give a record of the arrival and departure of the train at or from the section of the track opposite a track instrument.

Since the lever arms 35 and 36 which control the rotation of the disk and actuate the winding mechanism, respectively, are integral with each other, the winding of the coiled spring of the spring motor for rotating the contact wheel occurs simultaneously with the rotating of the contact wheel, which will insure that the spring of the spring motor will remain fully wound and yet permitting rotation of the contact wheel during the operation of winding the same, while the motor cannot be over-wound due to the yielding connection interposed in the winding mechanism. Furthermore, all of the moving parts of the track instrument, with the exception of the disk 27, are inclosed within a weather-proof casing and since this disk is circular in form, it is unlikely to be clogged or jammed by the climatic elements or conditions to which it is subjected whereby a compact construction is obtained which is entirely reliable in its operation.

I claim:—

1. In a track instrument, a rotary contact wheel, a spring motor for actuating said wheel, means including a pawl and ratchet connection for winding same, a member controlled by a car passing over the track rail for actuating said pawl, and a yielding connection interposed between said pawl and said member, said connection yielding only when said spring motor is wound to a predetermined degree.

2. In a track instrument, the combination with a rotary contact wheel and a spring motor therefor, of a member adapted to be actuated by a passing car, an arm having a yielding connection with said member, and winding mechanism actuated by said arm, said connection yielding only upon abnormal movement of said member.

3. In a track instrument, the combination with a rotary contact wheel and a spring motor therefor, of a member adapted to be actuated by a passing car, winding mechanism for said motor, and an arm actuated by said member for operating said winding member, and means for maintaining the movement of said arm uniform upon abnormal movement of said member.

4. In a track instrument, a member adapted to be actuated by a passing car, a shaft upon which said member rocks, an arm mounted on said shaft, and a friction clutch on said shaft for rotating said arm, stops for preventing abnormal movement of said arm, said clutch yielding on abnormal movement of said member.

5. In a track instrument, a rocking arm, means controlled by a passing train for actuating said arm, a rotary contact wheel, a motor for rotating said wheel, stops mounted for rotation with said wheel, a rod adapted to coöperate with said stop to control the starting and stopping of said wheel, and means for moving said rod controlled by the rocking arm.

6. In a track instrument, a rocking arm, means controlled by a passing train for actuating said arm, a rotary contact wheel, a motor for rotating said wheel, stops mounted for rotation with said wheel, a rod adapted to coöperate with said stop to control the starting and stopping of said wheel, and means for imparting to said rod movement in a uniform path irrespective of the throw of the rocking arm.

7. In a track instrument, a rocking arm, means controlled by a passing train for actuating said arm, a rotary contact wheel, a motor for rotating said wheel, two stops mounted for rotation with said wheel and arranged out of radial and circumferential alinement, a slidably mounted rod normally in engagement with one of said stops, and means for moving said rod out of engagement with one of said stops and into the path of the other of said stops.

8. In a track instrument, a member adapted to be actuated by a car or train in passing over a track rail, and means controlled by a single actuation of said member for repeating a plurality of times a number of electric impulses of a determined duration and in a determined order of succession.

9. In a track instrument, a rotating contact wheel, a member adapted to be actuated by the depression of a track rail, a stop rotating with said wheel, a slidable rod coöperating with said stop, means for maintaining the stroke of said rod uniform, and yielding connection between said member and said rod, said connection yielding only upon abnormal movement of said member.

In witness whereof, I subscribe my signature, in the presence of two witnesses.

JOHN N. JOHNSON.

Witnesses:
WALDO M. CHAPIN,
WM. L. ROSENBAUM.

Copies of this patent may be obtained for five cents each, by addressing the "Commissioner of Patents, Washington, D. C."